US011966736B2

United States Patent
Park

(10) Patent No.: US 11,966,736 B2
(45) Date of Patent: Apr. 23, 2024

(54) INTERCONNECT DEVICE FOR SELECTIVELY ACCUMULATING READ DATA AND AGGREGATING PROCESSING RESULTS TRANSFERRED BETWEEN A PROCESSOR CORE AND MEMORY

(71) Applicant: Samsung Electronics Co., Ltd., Suwon-si (KR)

(72) Inventor: Yongha Park, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 429 days.

(21) Appl. No.: 16/922,257

(22) Filed: Jul. 7, 2020

(65) Prior Publication Data

US 2021/0192326 A1  Jun. 24, 2021

(30) Foreign Application Priority Data

Dec. 24, 2019  (KR) .................. 10-2019-0173846

(51) Int. Cl.
  *G06F 9/30*   (2018.01)
  *G06F 9/34*   (2018.01)
  *G06F 9/38*   (2018.01)
  *G06F 13/16*  (2006.01)

(52) U.S. Cl.
  CPC .......... *G06F 9/3004* (2013.01); *G06F 9/3001* (2013.01); *G06F 9/34* (2013.01); *G06F 9/3877* (2013.01); *G06F 13/1668* (2013.01)

(58) Field of Classification Search
  CPC .. G06F 9/3001; G06F 9/3004; G06F 9/30043; G06F 9/3877; G06F 12/1081; G06F 13/1668; G06F 13/28; G06F 15/7821
  See application file for complete search history.

(56) References Cited

U.S. PATENT DOCUMENTS

| 4,908,748 A * | 3/1990 | Pathak ................ G06F 15/7814 711/220 |
| 7,296,136 B1 | 11/2007 | Collard et al. |
| 9,836,277 B2 | 12/2017 | Guz et al. |
| 10,332,594 B2 | 6/2019 | Miyashita et al. |
| 10,360,971 B1 | 7/2019 | Hokenmaier et al. |

(Continued)

FOREIGN PATENT DOCUMENTS

| KR | 10-2019-0036358 A | 4/2019 |
| KR | 10-1975534 B1 | 5/2019 |

OTHER PUBLICATIONS

Jouppi, Norman P. et al., "In-Datacenter Performance Analysis of a Tensor Processing Unit." *Proceedings of the 44th Annual International Symposium on Computer Architecture*, 2017 (pp. 1-12).

Li, Youjie et al., "Accelerating Distributed Reinforcement Learning with In-Switch Computing." *2019 ACM/IEEE 46th Annual International Symposium on Computer Architecture (ISCA)*, 2019 (pp. 279-291).

(Continued)

*Primary Examiner* — David J. Huisman
(74) *Attorney, Agent, or Firm* — NSIP Law

(57) ABSTRACT

An interconnect device may include one or more hardware-implemented modules configured to: receive a command from a processing core; perform, based on the received command, an operation including either one or both of an accumulation of sets of data stored in a memory and an aggregation of results processed by the processing core; and provide a result of the performing of the operation.

26 Claims, 13 Drawing Sheets

(56) References Cited

U.S. PATENT DOCUMENTS

| | | | | |
|---|---|---|---|---|
| 2001/0037427 | A1* | 11/2001 | Ogawa | G06F 9/30101 711/100 |
| 2003/0120880 | A1* | 6/2003 | Banno | G11C 7/1006 712/E9.019 |
| 2008/0004874 | A1* | 1/2008 | Klug | G06F 9/3017 712/E9.028 |
| 2014/0075135 | A1* | 3/2014 | Choi | G06F 12/00 711/155 |
| 2017/0220511 | A1 | 8/2017 | Burchard et al. | |
| 2019/0087708 | A1* | 3/2019 | Goulding | G06N 3/082 |
| 2019/0088339 | A1* | 3/2019 | Miyashita | G11C 11/54 |
| 2021/0208801 | A1* | 7/2021 | Song | G06F 3/0604 |

OTHER PUBLICATIONS

Song, Jinook et al., "7.1 An 11.5 TOPS/W 1024-MAC Butterfly Structure Dual-Core Sparsity-Aware Neural Processing Unit in 8nm Flagship Mobile SoC." *2019 IEEE International Solid-State Circuits Conference—(ISSCC)*, 2019 (pp. 130-132).

Gupta, Udit et al., "The Architectural Implications of Facebook's DNN-based Personalized Recommendation." *2020 IEEE International Symposium on High Performance Computer Architecture (HPCA)*, 2020 (pp. 1-14).

Extended European search Report dated Feb. 17, 2021 in counterpart EP Application No. 20191987.5 (11 pages in English).

European Office Action dated Aug. 2, 2023, in counterpart European Patent Application No. 20 191 987.5 (5 pages in English).

\* cited by examiner

INTERCONNECT DEVICE FOR SELECTIVELY ACCUMULATING READ DATA AND AGGREGATING PROCESSING RESULTS TRANSFERRED BETWEEN A PROCESSOR CORE AND MEMORY

CROSS-REFERENCE TO RELATED APPLICATIONS

This application claims the benefit under 35 USC § 119(a) of Korean Patent Application No. 10-2019-0173846 filed on Dec. 24, 2019, in the Korean Intellectual Property Office, the entire disclosure of which is incorporated herein by reference for all purposes.

BACKGROUND

1. Field

The following description relates to an interconnect device, an operation method of the interconnect device, and an artificial intelligence (AI) accelerator system including an interconnect device.

2. Description of Related Art

As artificial intelligence (AI) technology develops, there is an increasing need for independent hardware exclusively dedicated to AI. AI may perform inference and learning through an operation, for example. Various devices are being developed as dedicated hardware to embody and implement AI.

Such dedicated hardware for AI may be embodied by, for example, a central processing unit (CPU) and a graphics processing unit (GPU), and repurposed by, for example, a field-programmable gate array (FPGA) and an application-specific integrated circuit (ASIC).

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an interconnect device includes one or more hardware-implemented modules configured to: receive a command from a processing core; perform, based on the received command, an operation including either one or both of an accumulation operation on sets of data stored in a memory and an aggregation operation on results processed by the processing core; and provide a result of the performing.

The received command may include either one of: address information in which an operation code (opcode) for each of the accumulation operation and the aggregation operation and sets of data for performing an operation based on the opcode are stored; and address information of the memory in which the sets of data are stored.

The one or more hardware-implemented modules may include: a command module configured to store and transmit the received command; an address module configured to store and transmit address information of the memory in which sets of data for performing the operation based on the received command are stored; and a read data module configured to transmit, to the processing core, data read from the memory or cumulative data in which sets of data read from the memory are accumulated, based on the received command.

The read data module may include: an adder configured to add the data read from the memory and data stored in the read data module, based on the received command; and a multiplexer (MUX) configured to provide the read data module with either one of the data read from the memory and the added data, based on the received command.

The read data module may further include: a multiplier configured to multiply the data read from the memory and the data stored in the read data module together, based on the received command.

The one or more hardware-implemented modules may further include: a control module configured to provide the command module with a control signal based on the received command and provide the address module with an address of the memory based on the address information, in response to the address information being received from the processing core. The command module is configured to transmit the control signal to the read data module and the memory.

The control module may include: an address storage register configured to store therein a source address of the memory based on the address information; a counter register configured to perform counting based on the source address, based on the received command; and a controller configured to provide the address module with the address of the memory, the address of the memory being determined based on a result of the counting.

The one or more hardware-implemented modules may include: a control module configured to generate a control signal based on the received command, and determine an address of the memory based on address information received from the processing core; an address module configured to generate a signal corresponding to the address of the memory based on the received command; a command module configured to transmit, to the memory, the control signal, in response to the control signal being received from the control module; and a read data module configured to transmit, to the processing core, data read from the memory and cumulative data in which sets of data read from the memory are accumulated, based on the control signal. The read data module may include a plurality of sub-data modules, and may be configured to provide the processing core with cumulative data stored in one sub-data module among the sub-data modules, based on the control signal. The cumulative data may be data in which the data read from the memory and data of the one sub-data module are accumulated.

The read data module may further include: an adder configured to add the data read from the memory and the data of the one sub-data module, based on the control signal; a first multiplexer (MUX) configured to output either one of the data read from the memory and the added data, based on the control signal; a demultiplexer (DEMUX) configured to output, to the one sub-data module, data output from the first MUX, based on the control signal; and a second MUX configured to output the data of the one sub-data module, based on the control signal.

The control module may include: a register configured to store therein a source address of the memory based on the address information; a counter register configured to perform counting based on the source address, based on the received command; and a controller configured to provide the address module with the address of the memory, the address of the memory being determined based on a result of the counting, and provide the command module with the control signal.

The one or more hardware-implemented modules may include: a control module configured to generate a control signal based on the received command, and determine an address of the memory based on address information received from the processing core; an address module configured to generate a signal corresponding to the address based on the received command; a command module configured to transmit, to the memory, the control signal upon the control signal being received from the control module; and a read data module configured to transmit, to the processing core, data read from the memory or cumulative data in which sets of data read from the memory are accumulated, based on the control signal. The read data module may include: a first sub-data module configured to store cumulative data in which sets of data received from the memory are accumulated; and a second sub-data module configured to store the data read from the memory. The read data module may be configured to output either one of the cumulative data and the data based on the control signal.

The one or more hardware-implemented modules may include: a command module configured to store and transmit the received command; an address module configured to store and transmit address information of the memory in which sets of data for performing the operation based on the received command are stored; and a write data module configured to transmit, to the memory, result data processed by the processing core or cumulative data in which sets of result data processed by and received from the processing core are accumulated, based on the command.

The write data module may include: an adder configured to add the result data processed by the processing core and data to be stored in the memory; and a multiplexer (MUX) configured to provide the memory with either one of the result data processed by the processing core and the added data.

The write data module may further include: a divider configured to divide the added data; or a shift register configured to shift the added data by one bit.

The one or more hardware-implemented modules may include: a command module configured to store and transmit the received command; an address module configured to store and transmit address information of the memory in which sets of data for performing the operation based on the received command are stored; a read data module configured to transmit, to the processing core, data read from the memory or cumulative data in which sets of data read from the memory are accumulated, based on the received command; and a write data module configured to transmit, to the memory, data received from the processing core or cumulative data in which sets of data received from the processing core are accumulated, based on the received command.

The read data module may include: an adder configured to add the data read from the memory and data stored in the read data module, based on the received command; and a multiplexer (MUX) configured to provide the read data module with either one of the data read from the memory and the added data, based on the received command.

The write data module may include: an adder configured to add the data received from the processing core and data to be stored in the memory; and a multiplexer (MUX) configured to provide the memory with either one of the data received from the processing core and the added data, based on the command.

The interconnect device may be configured to access the memory through direct memory access (DMA).

The processing core may include any one of a central processing unit (CPU), a graphics processing unit (GPU), and a neural processing unit (NPU).

The memory may include any one of a static random-access memory (SRAM), a dynamic RAM (DRAM), and a flash memory.

In another general aspect, an artificial intelligence (AI) accelerator system includes: processing cores; interconnect devices; and a memory, wherein the interconnect devices are connected to the processing cores and the memory, and wherein one of the interconnect devices is configured to: receive a command from at least one processing core among the processing cores; perform, based on the received command, an operation including either one or both of an accumulation operation on sets of data stored in the memory and an aggregation operation on results processed by the at least one processing core; and provide the memory or the at least one processing core with a result of the performing.

In another general aspect, an operation method of an interconnect device includes: receiving a command from a processing core; performing, based on the received command, an operation including either one or both of an accumulation operation on sets of data stored in a memory and an aggregation operation on results obtained through distributed processing by the processing core; and transmitting a result of the performing.

The received command may include either one of: address information in which an operation code (opcode) for each of the accumulation operation and the aggregation operation and sets of data for performing an operation based on the opcode are stored; and address information of the memory in which the sets of data are stored.

In another general aspect, a non-transitory computer-readable storage medium stores instructions that, when executed by a processor, cause the processor to perform the operation method described above.

In another general aspect, a processing accelerator system includes: a neural processing unit; a memory; a memory controller connected to the neural processing unit and the memory, and configured to: receive a command from the neural processing unit; perform, based on the received command, an operation including either one or both of an accumulation operation on sets of data stored in the memory and an aggregation operation on results processed by the at least one processing core; and transmit, to the memory or the neural processing unit, a result of the performing.

The memory controller may include: a command module configured to store and transmit the received command; an address module configured to store and transmit address information of the memory in which sets of data for performing the operation based on the received command are stored; and a read data module configured to transmit, to the processing core, data read from the memory or cumulative data in which sets of data read from the memory are accumulated, based on the received command.

The memory controller may further include: an adder configured to add the data read from the memory and data stored in the read data module, based on the received command; and a multiplexer (MUX) configured to provide the read data module with either one of the data read from the memory and the added data, based on the received command.

The memory controller may include: a command module configured to store and transmit the received command; an address module configured to store and transmit address information of the memory in which sets of data for performing the operation based on the received command are stored; and a write data module configured to transmit, to the memory, result data processed by the processing core or cumulative data in which sets of result data processed by and received from the processing core are accumulated, based on the command.

The memory controller may further include: an adder configured to add the result data processed by the processing core and data to be stored in the memory; and a multiplexer (MUX) configured to provide the memory with either one of the result data processed by the processing core and the added data.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
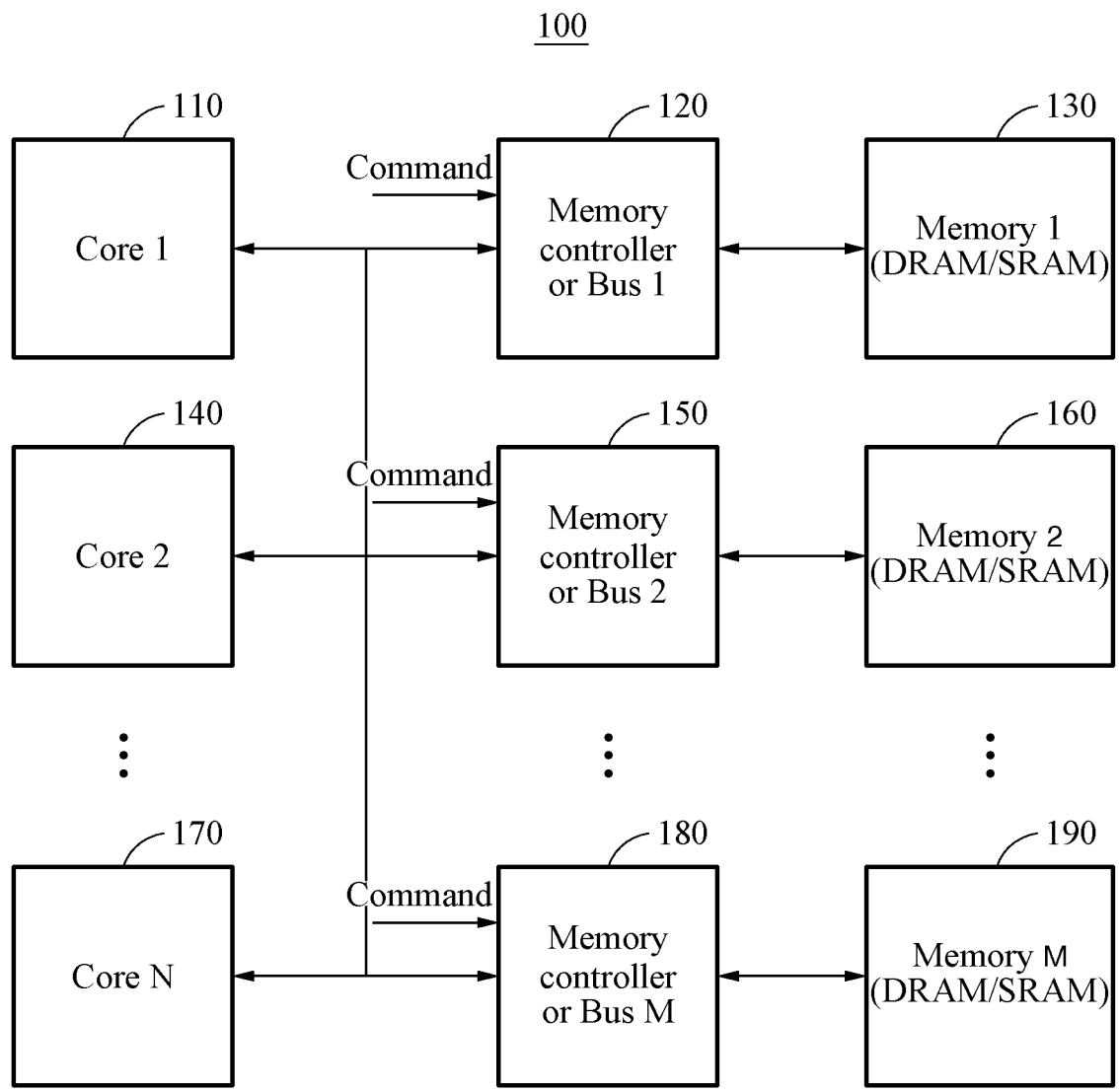
FIG. 1 is a diagram illustrating an example of an artificial intelligence (AI) accelerator system including an interconnect device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

The features of the examples described herein may be combined in various ways as will be apparent after an understanding of the disclosure of this application. Further, although the examples described herein have a variety of configurations, other configurations are possible as will be apparent after an understanding of the disclosure of this application.

Also, in the description of example embodiments, detailed description of structures or functions that are thereby known after an understanding of the disclosure of the present application will be omitted in the interest of conciseness.

FIG. 1 is a diagram illustrating an example of an artificial intelligence (AI) accelerator system 100 including an interconnect device. Referring to FIG. 1, the AI accelerator system 100 includes, for example, a plurality of processing cores 110, 140, . . . , and 170, a plurality of interconnect devices 120, 150, . . . , and 180, and a plurality of memories 130, 160, . . . , and 190.

Data may be exchanged between the processing cores 110, 140, . . . , and 170 and the memories 130, 160, . . . , and 190 through the interconnect devices 120, 150, ..., and 180. Each of the processing cores 110, 140, ..., and 170 may include any one of a central processing unit (CPU), a graphics processing unit (GPU), and a neural processing unit (NPU), for example. Each of the memories 130, 160, ..., and 190 may include one of a static random-access memory (SRAM), a dynamic RAM (DRAM), and a flash memory, for example.

The AI accelerator system 100 may be embodied in a form of, for example, a system on chip (SoC), and may be embodied as a single system.

Each of the interconnect devices 120, 150, ..., and 180 may be a bus component such as a bus interconnector that interconnects the processing cores 110, 140, ..., and 170, or an interconnect component such as a memory controller that connects the processing cores 110, 140, ..., and 170 and the memories 130, 160, ..., and 190. The interconnect devices 120, 150, ..., and 180 may access the memories 130, 160, ..., and 190 through direct memory access (DMA), for example.

The processing cores 110, 140, ..., and 170 may maintain and/or expand a function of a bus and memory controller through an operation by an adder and a multiplexer (MUX), instead of a multiply-accumulate (MAC) operation, and, thus, may be optimized for an AI operation having a sparse, high-capacity memory access characteristic.

The interconnect devices 120, 150, ..., and 180 may receive, from the processing cores 110, 140, ..., and 170, a command for performing an operation function such as an accumulation operation on sets of data stored in the memories 130, 160, ..., and 190 and an aggregation operation on results obtained through processing by at least one of the processing cores 110, 140, ..., and 170.

For example, when receiving a request for memory access from the processing cores 110, 140, ..., and 170, the interconnect devices 120, 150, ..., and 180 may receive an additional command or a new command in addition to a memory read and/or write signal.

In an example, the command may include either one or both of an operation code (opcode) for each of the accumulation operation and the aggregation operation, and address information in which sets of data for performing an operation associated with the opcode are stored. The opcode may correspond to an accumulation operation command for performing the accumulation operation, an aggregation operation command for performing the aggregation operation, a memory read command associated with the accumulation operation, a memory write command associated with the aggregation operation, a reset command for a memory storing sets of data, and one or a combination of reset commands for a register storing sets of data. According to examples, the opcode may include a flag bit that indicates whether to perform the accumulation operation or the aggregation operation. The address information may include information indicating an address of a memory in which sets of data for performing the operation associated with the command are stored. The information indicating the address may include an index of at least one register for performing the accumulation operation.

The interconnect devices 120, 150, ..., and 180 may perform various operations, in addition to accessing a memory, based on a command received from the processing cores 110, 140, ..., and 170.

An operation to be performed by the interconnect devices 120, 150, ..., and 180 may include the accumulation operation that performs an elementwise summation by reading, from the memories 130, 160, ..., and 190, vectorized data such as SparseLengthSum used for recommendation, for example. The accumulation operation may include an elementwise operation such as an elementwise multiplication (product) and a weighted sum on sets of data stored in the memories 130, 160, ..., and 190, in addition to the elementwise summation.

In addition, an operation to be performed by the interconnect devices 120, 150, ..., and 180 may include the aggregation operation that aggregates gradients obtained through distributed processing in a learning or training process. The interconnect devices 120, 150, ..., and 180 may write the gradients in the memories 130, 160, ..., and 190 all at once by performing the aggregation operation, and, thus, may reduce the number of instances of memory access.

According to examples, the processing cores 110, 140, ..., and 170 may be interconnected with one another and form a cluster that operates as a single system. For example, when the processing cores 110, 140, ..., and 170 form the single cluster, the processing core 140 may operate as a master core, and the remaining processing cores including 110 and 170 may operate as slave cores. In this example, the processing core 140 operating as the master core may perform the aggregation operation on results obtained through distributed processing by the remaining processing cores operating as the slave cores, or transmit same data to the remaining processing cores operating as the slave cores. For example, the processing core 140 may transmit the same data to each of the processing cores included in the cluster by a broadcast command.

In this example, the processing core 140, operating as the master core, and the remaining processing cores, operating as the slave cores, may be connected through an interconnect device. For example, the interconnect device may receive results obtained through distributed processing by the processing cores operating as the slave cores, perform the aggregation operation, and then transmit a result of performing the aggregation operation to the processing core 140, which is operating as the master core. Alternatively, the interconnect device may respond to the broadcast command received from the processing core 140, and broadcast data received from the processing core 140 to the processing cores operating as the slave cores.

For example, such operations described above may be performed when the processing cores 110, 140, ..., and 170 perform, in parallel, an inference operation according to a recommendation scenario and perform an aggregation operation on a result of performing the inference operation, and/or when the processing cores 110, 140, ..., and 170 process data corresponding to different users, respectively.

In an example, the interconnect devices 120, 150, ..., and 180 may perform at least one of an accumulation operation on sets of data stored in the memories 130, 160, ..., and 190 or an aggregation operation on results obtained through processing by the processing cores 110, 140, ..., and 170, without a structural change of a memory chip, based on a command(s) received from the processing cores 110, 140, ..., and 170. The interconnect devices 120, 150, ..., and 180 may then provide a result of performing the at least one operation to the memories 130, 160, ..., and 190 and/or the processing cores 110, 140, ..., and 170.

The memories 130, 160, ..., and 190 may correspond to memory banks included in a single memory, or sub-sets of a single memory, for example. Hereinafter, example structures of each of the interconnect memories 120, 150, ..., and 180 will be described in detail with reference to FIGS. 2 through 7.

Figure 2:
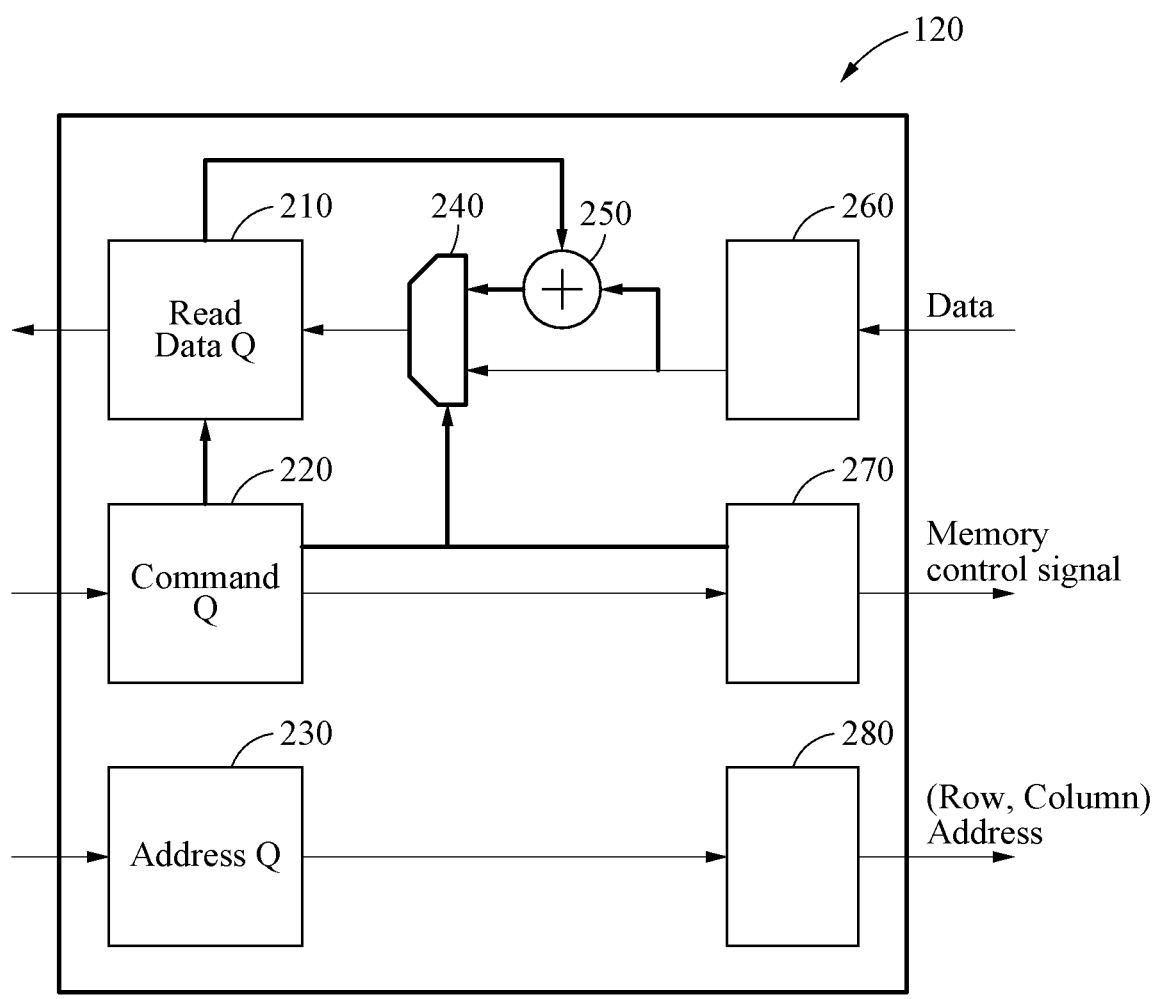
FIGS. 2 through 7 are diagrams illustrating examples of an interconnect device.

FIG. 2 illustrates an example of the interconnect device 120, which is configured to perform an accumulation operation. Referring to FIG. 2, the interconnect device 120 may include, for example, a read data module 210, a command module 220, an address module 230, a MUX 240, an adder 250, a data port 260, a control port 270, and an address port 280. In the example of FIG. 2, each of the read data module 210, the command module 220, and the address module 230 may be configured as a queue (Q), for example. In addition, each of the data port 260, the control port 270, and the address port 280 may be configured as a register or a buffer, for example.

The interconnect device 120 may perform a memory read operation when performing an accumulation operation. The interconnect device 120 may perform an operation (e.g., summation, elementwise summation, and/or weighted sum) on data stored in the read data module 210, and data read from a memory and stored in the data port 260, using the adder 250 and the MUX 240. The interconnect device 120 may then transmit a result of performing the operation to a processing core.

The read data module 210 may transmit, to the processing core through the data port 260, the data read from the memory or cumulative data in which sets of data read from the memory are accumulated, based on a command received from the processing core. In an example, the read data module 210 may include the MUX 240 and the adder 250.

The MUX 240 may provide the read data module 210 with one of the data read from the memory and the added data, based on the command of the processing core, for example, a select signal. The adder 250 may add the data read from the memory and data stored in the read data module 210, based on the command. A result of such adding by the adder 250 may be applied as a single input to the MUX 240. For example, when the command of the processing core is a command (select=0) which is for outputting the data read from the memory, the MUX 240 may transmit the data read from the memory to the read data module 210 through the data port 260. In another example, when the command of the processing core is a command (select=1) which is for outputting the added data, the MUX 240 may transmit, to the read data module 210 through the data port 260, the result of adding the data read from the memory and the data stored in the read data module 210 by the adder 250. For example, when the command (select=1) for outputting the added data is continuously transmitted to the MUX 240, the read data module 210 may receive cumulative added data output from the MUX 240.

The command module 220 may store and transmit the command received from the processing core. The command module 220 may apply the command received from the processing core to the MUX 240 and also transmit the command to the memory through the control port 270.

The address module 230 may store and transmit address information of the memory in which sets of data for performing the operation associated with the command are stored. The address module 230 may transmit address information received from the processing core to the memory through the address port 280. The address information may include a row and column address of the memory.

Each of the data port 260, the control port 270, and the address port 280 may configured as a register. For example, the processing core such as a CPU may not store data itself, and thus may not directly transmit data to the memory. Thus, for an operation, it may need to pass through a register. For this, the register may indicate an address or read a value. In the example, each of the data port 260, the control port 270, and the address port 280 may indicate an address of the memory or read a value from the address.

According to examples, the read data module 210 may further include a multiplier (not shown) configured to multiply the data read from the memory and the data stored in the read data module 210 together, based on the command received from the processing core. The multiplier may multiply the data read from the memory and transposed data of the data.

Figure 3:
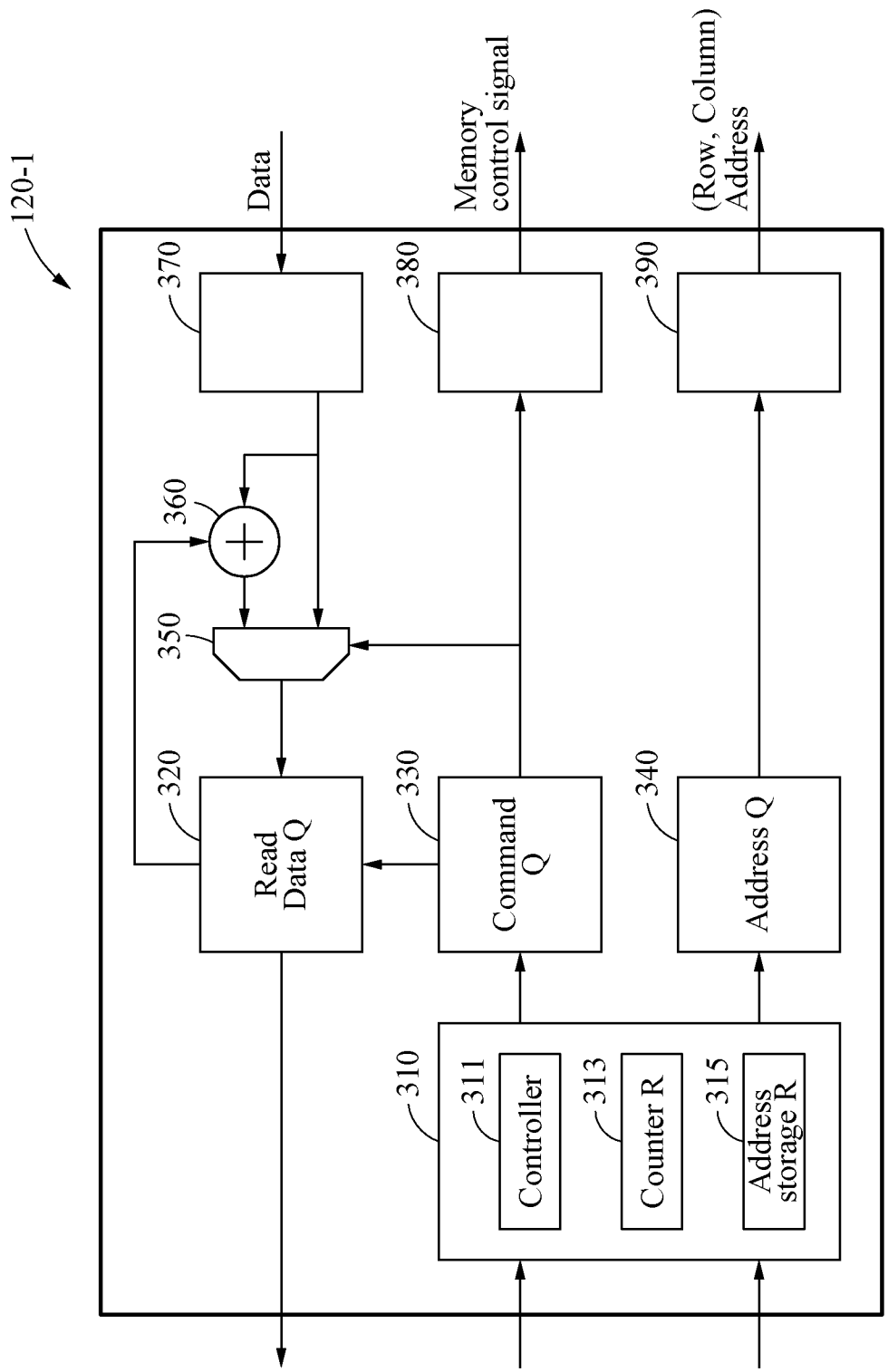

FIG. 3 illustrates another example of an interconnect device 120-1 configured to perform an accumulation operation. Referring to FIG. 3, the interconnect device 120-1 includes, for example, a control module 310, a read data module 320, a command module 330, an address module 340, a MUX 350, an adder 360, a data port 370, a control port 380, and an address port 390.

The control module 310 may provide the command module 330 with a control signal based on a command received from a processing core, and may provide the address module 340 with an address of a memory based on address information received from the processing core. The control module 310 may include, for example, a controller 311, a counter register 313, and an address storage register 315. In the example of FIG. 3, a register is illustrated as R.

The controller 311 may provide the address module 340 an address determined based on a counting result of the counter register 313. The controller 311 may include a control register configured to define a bit that gives a data transmission start command or a bit that determines a transmission mode to be used to transmit data. The transmission mode may include a single address mode and a burst address mode, for example.

Through the single address mode, the controller 311 may read and write data of the memory all at once. An address that reads data from the memory may correspond to a source address, and an address that writes data in the memory may correspond to a destination address. For example, the controller 311 may read or write data from or in the memory while reducing a count value of the counter register 313 by 1 until the counter value reaches 0. In this example, when the counter value reaches 0, the controller 311 may transmit, to the processing core, an interrupt signal such as DMA_INT.

Through the burst address mode, the controller 311 may continuously repeat reading and writing data from and in the memory from start to end while reducing a count value of the counter register 313 by 1 according to the address of the memory based on the address information. When the counter value reaches 0, the controller 311 may transmit an interrupt signal to the processing core, as in the single address mode.

The counter register 313 may perform counting based on the source address according to the command received from the processing core. The address storage register 315 may store the source address of the memory based on the address information received from the processing core.

The command module 330 may transmit a control signal received from the control module 310 to the read data module 320 and transmit the control signal also to the memory through the control port 380.

In addition, the read data module 320, the address module 340, the MUX 350, the adder 360, the data port 370, the control port 380, and the address port 390 may perform the same respective operations described above with reference to FIG. 2. Thus, reference may be made to the operations of the read data module 210, the address module 230, the MUX 240, the adder 250, the data port 260, the control port 270, and the address port 280 that are described above with reference to FIG. 2.

Figure 4:
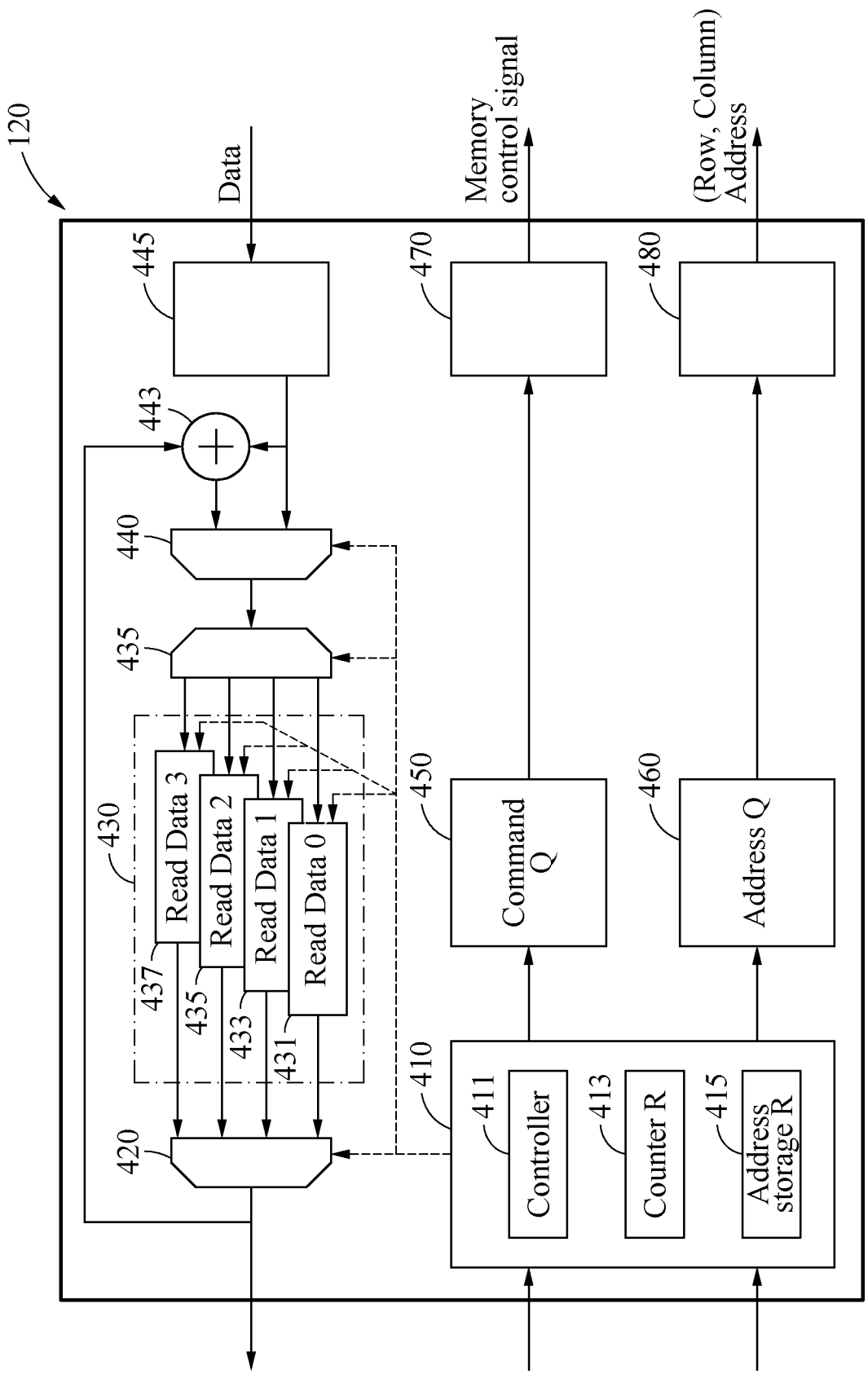

FIG. 4 illustrates another example of an interconnect device 120-2 configured to perform an accumulation operation. Referring to FIG. 4, the interconnect device 120-2 includes, for example, a control module 410, a second MUX 420, a read data module 430, a demultiplexer (DEMUX) 435, a first MUX 440, an adder 443, a data port 445, a command module 450, an address module 460, a control port 470, and an address port 480.

The control module 410 may generate a control signal based on a command of a processing core, and determine an address of a memory based on address information received from the processing core. Similar to the control module 310 described above with reference to FIG. 3, the control module 410 may include, for example, a controller 411, a counter register 413, and an address storage register 415. For a more detailed description of an operation of each component of the control module 410, reference may be made to the operation of each component of the control module 310 described above with reference to FIG. 3.

The address module 460 may generate a signal corresponding to the address based on the command of the processing core. The signal corresponding to the address may be transmitted to the memory through the address port 480.

The command module 450 may transmit the control signal received from the control module 410 to the memory. The control signal may be transmitted to the memory through the control port 470.

The read data module 430 may transmit, to the processing core, data read from the memory or cumulative data in which sets of data read from the memory are accumulated, based on the control signal received from the control module 410. The read data module 430 may include, for example, a plurality of sub-data modules 431, 433, 435, and 437. As illustrated in FIG. 4, indices 0, 1, 2, and 3 may be respectively assigned to the sub-data modules 431, 433, 435, and 437.

The read data module 430 may provide the processing core with cumulative data stored in one of the sub-data modules 431, 433, 435, and 437 based on the control signal received from the control module 410. The cumulative data may be data in which the data read from the memory and data of the one sub-data module are accumulated.

In an example, the read data module 430 may include the second MUX 420, the DEMUX 435, the first MUX 440, and the adder 443.

The adder 443 may add the data read from the memory and the data of the one sub-data module among the sub-data modules 431, 433, 435, and 437, based on the control signal of the control module 410.

The first MUX 440 may output one of the data read from the memory and the added data based on the control signal of the control module 410.

The DEMUX 435 may output, to the one sub-data module, the data output from the first MUX 440 based on the control signal of the control module 410.

The second MUX 420 may output the data of the one sub-data module based on the control signal of the control module 410.

Figure 5:
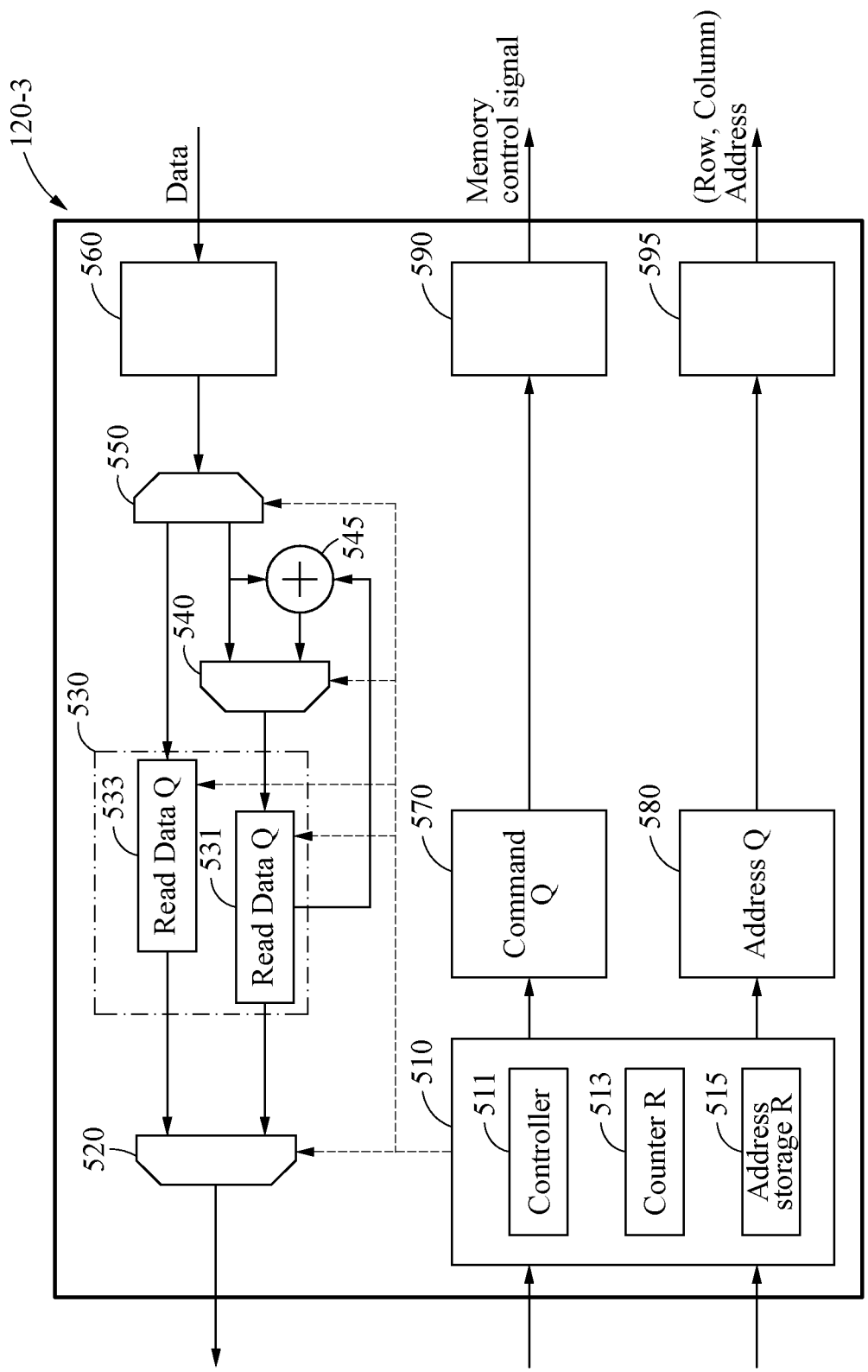

FIG. 5 illustrates another example of an interconnect device 120-3 configured to perform an accumulation operation. Referring to FIG. 5, the interconnect device 120-3 includes, for example, a control module 510, a second MUX 520, a read data module 530, a first MUX 540, a DEMUX 550, a data port 560, a command module 570, an address module 580, a control port 590, and an address port 595. For a more detailed description of respective operations of the command module 570, the address module 580, the control port 590, and the address port 595, reference may be made to the operations of the command module 450, the address module 460, the control port 470, and the address port 480 that are described above with reference to FIG. 4.

The control module 510 may generate a control signal based on a command of a processing core, and may determine an address of a memory based on address information received from the processing core.

The address module 580 may generate a signal corresponding to the address based on the command, and may transmit the signal to the memory through the address port 595.

The command module 570 may transmit the control signal received from the control module 510 to the memory through the control port 590.

The read data module 530 may transmit, to the processing core, data read from the memory or cumulative data in which sets of data read from the memory are accumulated, based on the control signal received from the control module 510. The read data module 530 may include, for example, a first sub-data module 531 and a second sub-data module 533. The first sub-data module 531 may store cumulative data in which sets of data received from the memory are accumulated. The second sub-data module 533 may store the data read from the memory.

The read data module 530 may output one of the cumulative data stored in the first sub-data module 531 and the data stored in the second sub-data module 533, based on the control signal received from the control module 510.

For example, when the data read from the memory is input to the DEMUX 550 through the data port 560, the DEMUX 550 may provide the data to the second sub-data module 533 or the first MUX 540 based on the control signal received from the control module 510.

For example, when the control signal is (select=0), the DEMUX 550 may provide the data read from the memory to the second sub-data module 533.

However, when the control signal is (select=1), the DEMUX 550 may transmit the data to the first MUX 540. The data transmitted to the first MUX 540 may be output through the first MUX 540 or be output by being added to the data stored in the first sub-data module 531 by the adder 545, based on the control signal of the control module 510. For example, based on the control signal (select=0), the first MUX 540 may provide the first sub-data module 531 with the data read from the memory. In contrast, based on the control signal (select=1), the first MUX 540 may provide the first sub-data module 531 with the data added by the adder 545.

Thus, the added data or the data read from the memory may be stored in the first sub-data module 531. In addition, the data read from the memory may be stored in the second sub-data module 533. The second MUX 520 may output the data stored in the first sub-data module 531 or the data stored in the second sub-data module 533, based on the control signal of the control module 510.

For example, when the control signal for the DEMUX 550 is (select=1) and the control signal for the first MUX 540 is (select=1), the added data may be stored in the first sub-data module 531. In this example, when the control signal for the second MUX 520 is (select=1), the second MUX 520 may provide the processing core with the added data.

Figure 6:
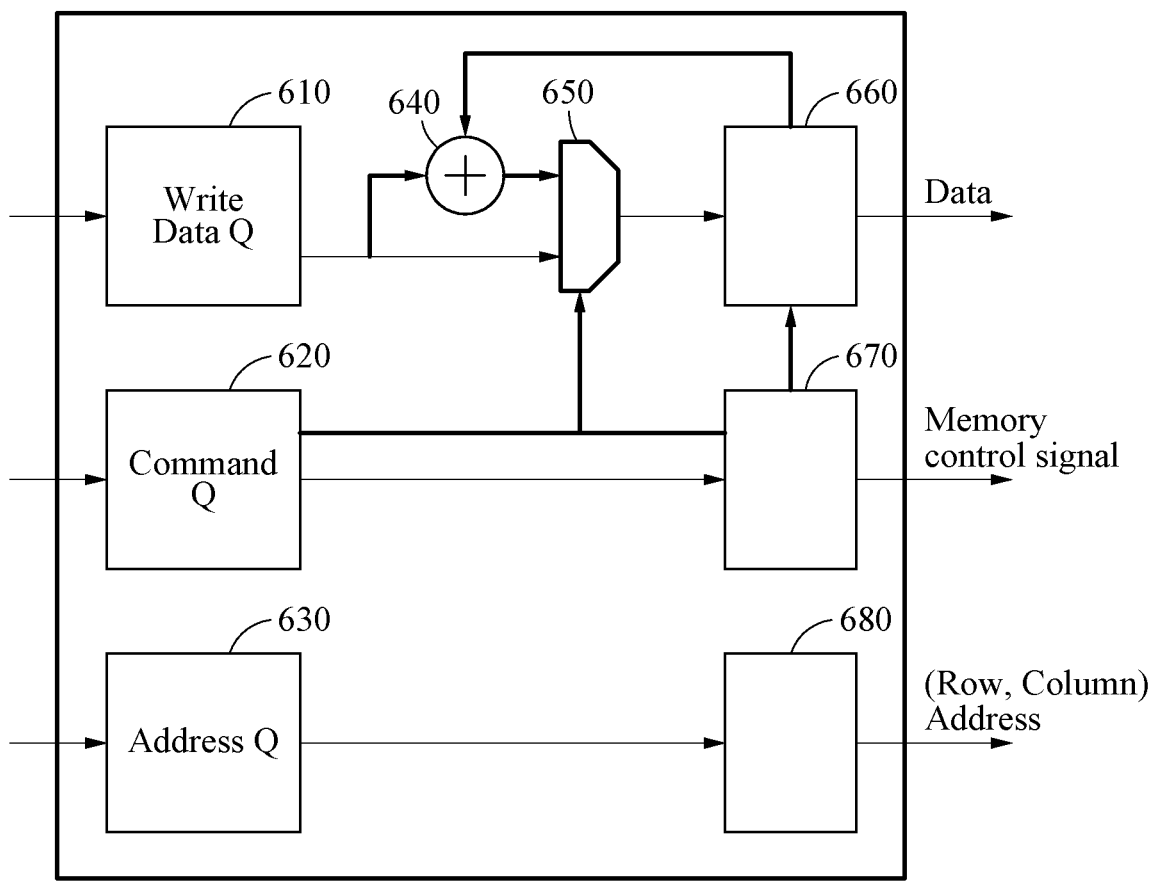

FIG. 6 illustrates an example of an interconnect device 600 configured to perform an aggregation operation. Referring to FIG. 6, the interconnect device 600 includes, for example, a write data module 610, a command module 620, an address module 630, an adder 640, a MUX 650, a data port 660, a control port 670, and an address port 680. In an example, each of the write data module 610, the command module 620, and the address module 630 may be configured as a queue (Q), for example. In addition, each of the data port 660, the control port 670, and the address port 680 may be configured as a register or a buffer, for example.

The interconnect device 600 may perform a memory write operation when performing an aggregation operation. When performing the memory write operation, the interconnect device 600 may perform an operation (e.g., summation, elementwise summation, and/or weighted sum) on data stored in the data port 660 and data received from a processing core, using the adder 640 and the MUX 650. The interconnect device 600 may then transmit a result of performing the operation to a memory through the data port 660.

The write data module 610 may transmit, to the memory, result data processed by the processing core or cumulative data in which sets of result data processed by and received from the processing core are accumulated, based on a command of the processing core. In an example, the write data module 610 may include the adder 640 and the MUX 650. The adder 640 may add the result data processed by the processing core and data to be stored in the memory. The MUX 650 may provide one of the result data processed by the processing core and the added data to the memory through the data port 660 based on the command of the processing core.

The command module 620 may store and transmit the command received from the processing core. The command module 620 may transmit the command received from the processing core to the MUX 650 and the data port 660. In addition, the command module 620 may transmit the command to the memory through the control port 670.

The address module 630 may store and transmit address information of the memory in which sets of data for performing an operation associated with the command received from the processing core are stored. The address module 630 may transmit the address information to the memory through the address port 680.

According to examples, the write data module 610 may further include a divider configured to divide the added data, which is data obtained by adding the result data processed by the processing core and the data to be stored in the memory, or a shift register configured to shift the added data by one bit.

Compared to an inference process, a learning process may require a great memory bandwidth demand and a great operation quantity, and thus distributed processing may be generally performed. However, collecting gradients obtained through the distributed processing may be one of the causes that restrict the performance. Thus, by implementing an aggregation operation that collects processed results from processing cores without an additional coherence and/or synchronization device when performing the memory writing operation, it is possible to reduce data traffic and latency, and reduce power consumption. In addition, by utilizing a memory bandwidth to be provided to the processing core for another operation, it is possible to improve an overall system performance.

Figure 7:
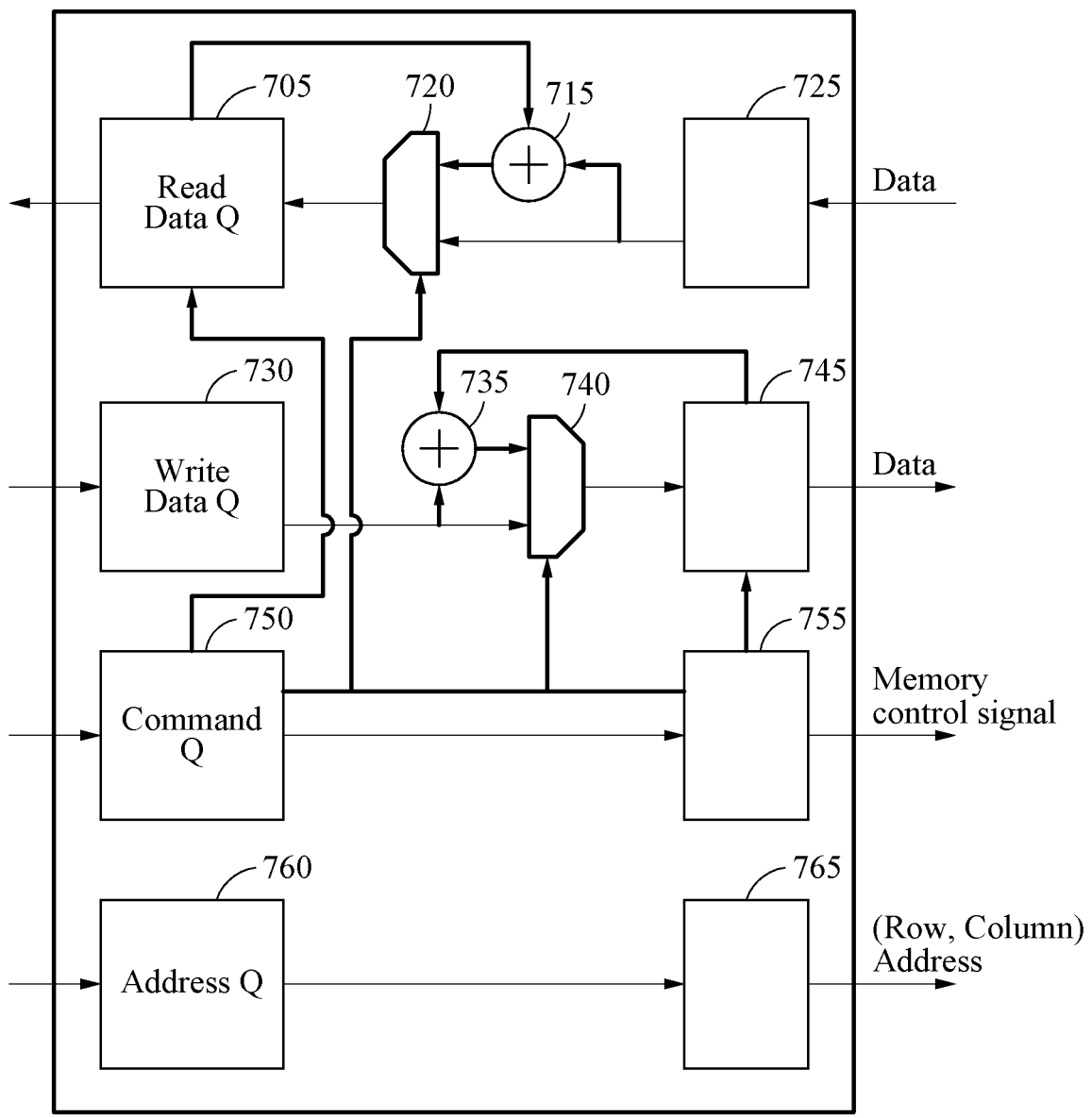

FIG. 7 illustrates an example of an interconnect device 700 configured to perform an accumulation operation and an aggregation operation. Referring to FIG. 7, the interconnect device 700 includes a read data module 705, an adder 715, a MUX 720, a read data port 725, a write data module 730, an adder 735, a MUX 740, a write data port 745, a command module 750, a control port 755, an address module 760, and an address port 765.

The read data module 705 may transmit, to a processing core, data read from a memory through the read data port 725 or cumulative data in which sets of data read from the memory are accumulated, based on a command of the processing core. The read data module 705 includes the adder 715 and the MUX 720. The adder 715 may add the data read from the memory through the read data port 725 and data stored in the read data module 705, based on the command of the processing core. The MUX 720 may provide the read data module 705 with one of the data read from the memory through the read data port 725 and the added data, based on the command of the processing core.

The write data module 730 may transmit, to the memory through the data port 745, data received from the processing core or cumulative data in which sets of data received from the processing core are accumulated, based on the command of the processing core. The write data module 730 includes the adder 735 and the MUX 740. The adder 735 may add the data received from the processing core and data to be stored in the memory. The MUX 740 may provide one of the data received from the processing core and the added data to the memory through the write data port 745, based on the command of the processing core.

The command module 750 may store and transmit the command received from the processing core. The command module 750 may transmit the command received from the processing core to the read data module 705 and the MUX 720, and/or to the write data module 730 and the MUX 740. In addition, the command module 750 may transmit the command received from the processing core to the memory through the control port 755.

The address module 760 may store and transmit address information of the memory in which sets of data for performing the operation associated with the command of the processing core are stored. The address module 760 may transmit the address information of the memory to the memory through the address port 765.

In an example, when processing read data through numerous times of memory access in an inference process such as recommendation, an interconnect device such as a memory controller or a component disposed between a processing core and a memory may directly process an operation, rather than the processing core accessing the memory each time, and then transmit only a result of the operation to the processing core. Thus, it is possible to reduce data traffic. In addition, the interconnect device may perform a function of aggregating gradients stored in a write data module in a process of writing gradients obtained through distributed processing in a learning process in a memory channel in which a corresponding weight is stored, and may thus reduce the number of instances of memory access. Through this, the interconnect device may reduce data traffic, and increase the performance of resources while decreasing latency. In addition, the interconnect device may reduce power consumption. Hereinafter, a relationship between latency and utilization of resources will be described with reference to FIG. 8.

Figure 8:
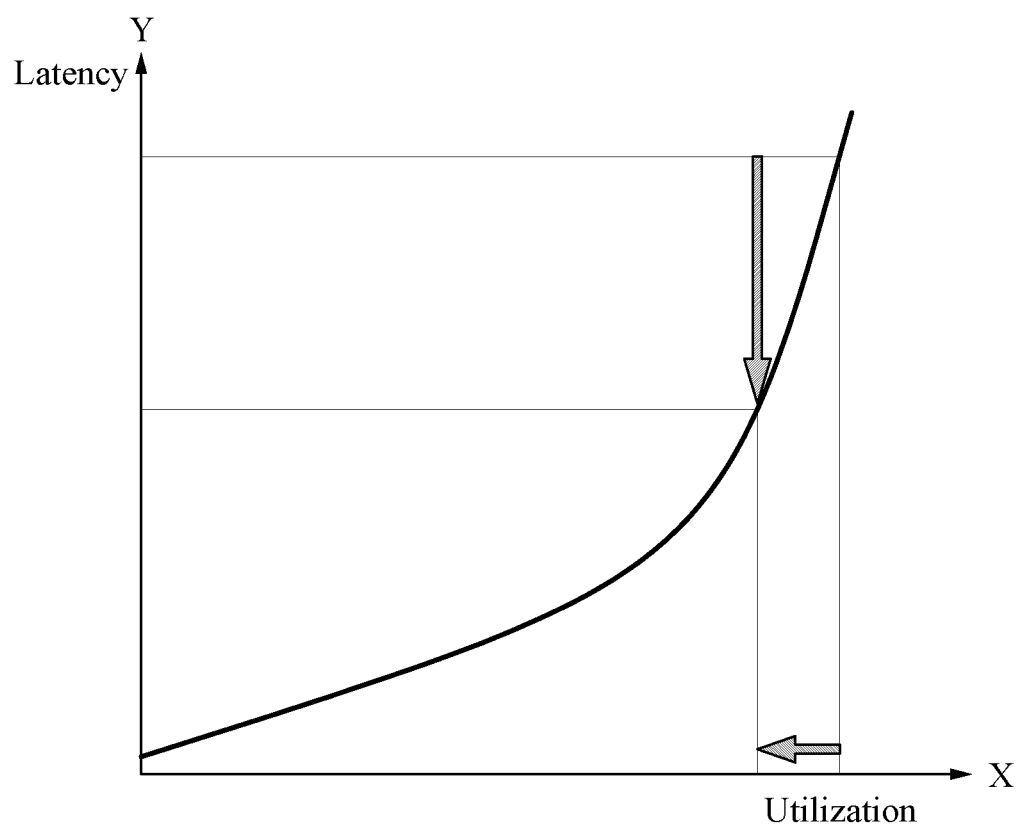
FIG. 8 is a graph illustrating an example of a relationship between latency and utilization of resources of an AI accelerator system.

FIG. 8 is a graph illustrating an example of a relationship between latency and utilization of resources of an AI accelerator system. In the graph of FIG. 8, the X axis indicates utilization of resources of an AI accelerator system, and the Y axis indicates latency.

Referring to the graph of FIG. 8, the latency and the utilization of resources of the AI accelerator system may have a relationship indicated in the form of an exponential function. In an example, by employing an interconnect device according to the examples disclosed herein, it is possible to reduce the number of instances of using the resources of the AI accelerator system, for example, the number of times of access to a processing core and/or the number of times of access to a memory. Thus, it is possible to greatly reduce latency. Due to such reduction in the latency by the interconnect device, it is possible to increase the performance of the resources and reduce power consumption.

Figure 9:
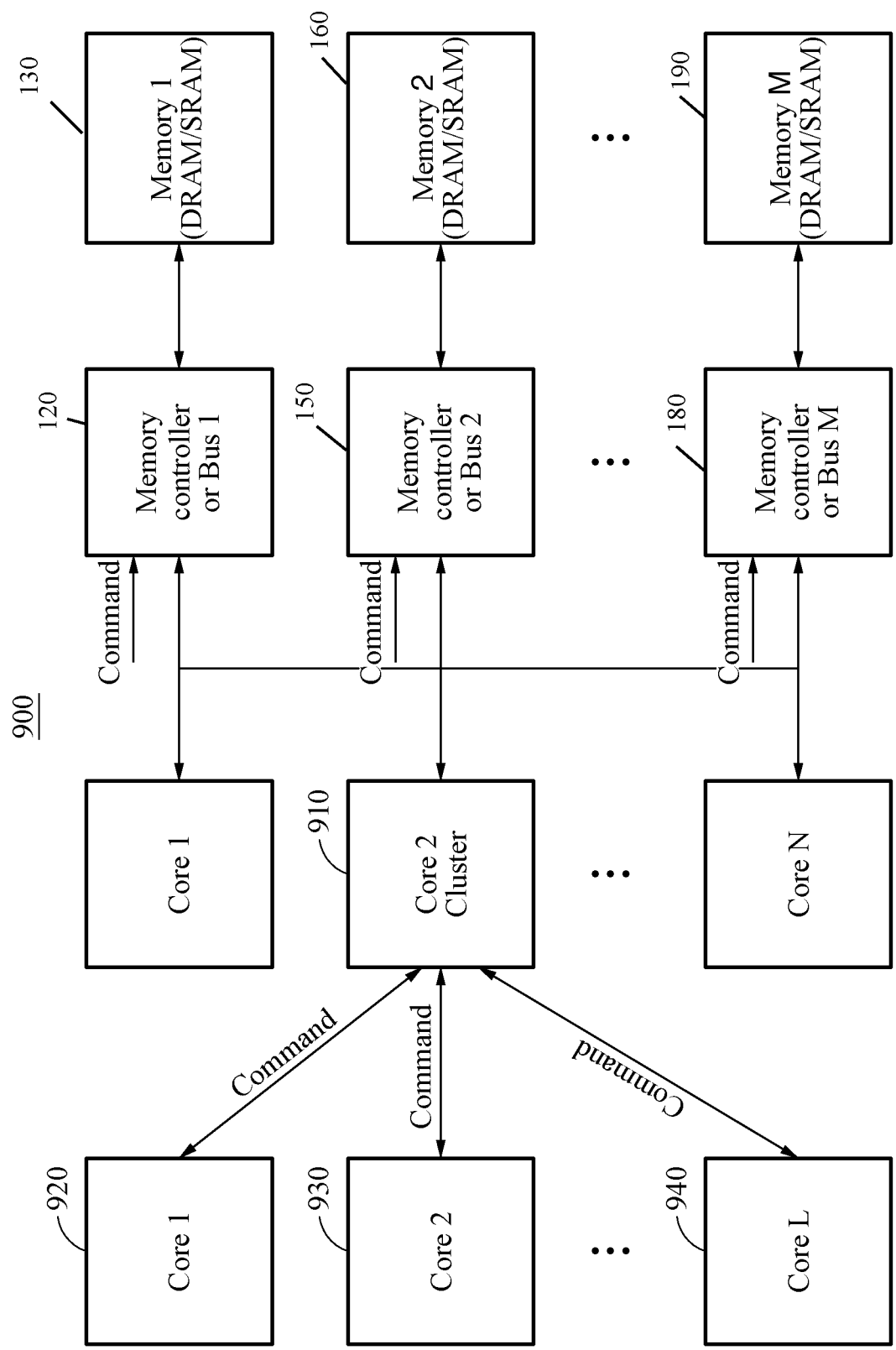
FIG. 9 is a diagram illustrating an example of a broadcast operation performed among processing cores participating in distributed processing.

FIG. 9 is a diagram illustrating an example of a broadcast operation performed among processing cores participating in distributed processing. Referring to FIG. 9, processing cores 910, 920, 930, and 940, among a plurality of processing cores included in an AI accelerator system 900, may form a single cluster.

For example, when data for performing an operation is stored in a plurality of memories by being distributed thereto and the operation is not completed in an interconnect device(s), the interconnect device(s) may receive, from a processing core(s), a new command or an additional command in addition to a memory read/write command. The interconnect device(s) may access a memory by, for example, reading/writing, and may also generate an intermediate result of the operation, based on the new command or the additional command. Other components of the AI accelerator system that receive the intermediate result from the interconnect device(s) may generate a final result by performing an additional operation based on the received intermediate result.

In the example of FIG. 9, in an example in which the processing core 910 is a master core of the cluster and the remaining processing cores 920, 930, and 940 are slave cores of the cluster, the processing core 910 may perform an aggregation operation on results obtained through distributed processing by the processing cores 920, 930, and 940. In addition, in a further example in which the processing core 910 is the master core and performs the distributed processing along with the processing cores 920, 930, and 940 included in the cluster, the processing core 910 may transmit a result of the distributed processing to each of the processing cores 920, 930, and 940 through a broadcast command, for example.

The broadcast command may include a function of broadcasting an operation result to processing cores participating in distributed processing. For example, a result of SparseLengthSum operation in an inference process may be simultaneously transmitted through a broadcast command to a plurality of processing cores of a cluster that refers to the result. In addition, a parameter updated in a learning process may be simultaneously transmitted to a plurality of processing cores participating in distributed learning through a broadcast command.

Figure 10:
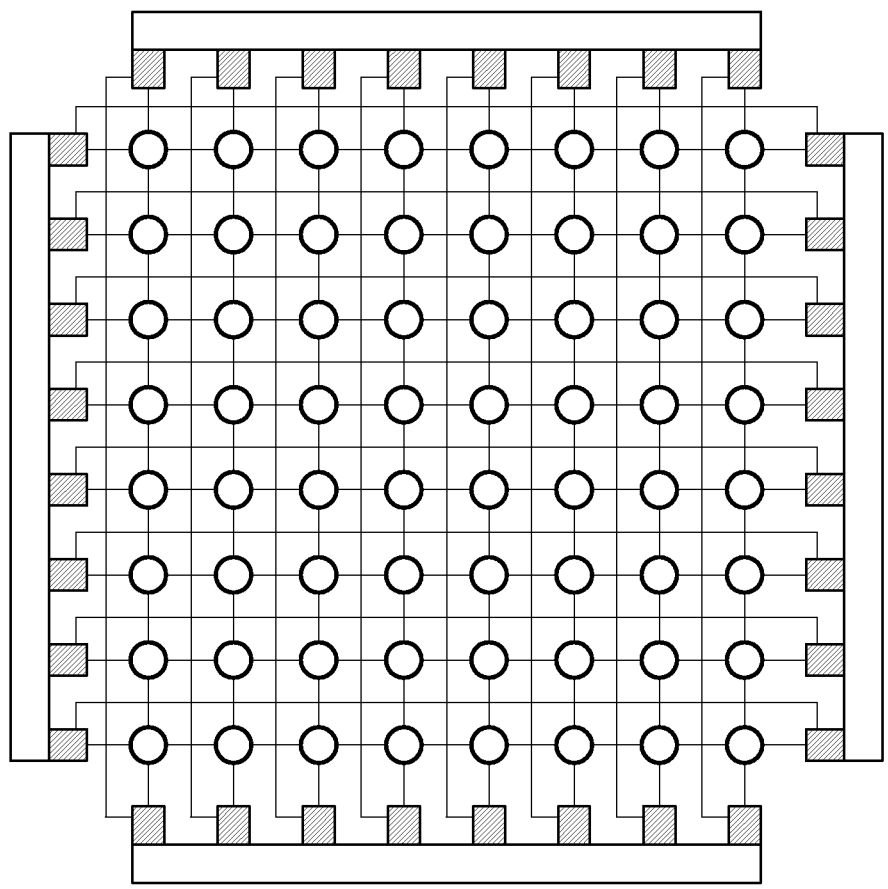
FIG. 10 is a diagram illustrating an example of an AI accelerator system of a flat structure.

FIG. 10 is a diagram illustrating an example of an AI accelerator system 1000 of a flat structure. Referring to FIG. 10, the AI accelerator system 1000 includes, for example, a plurality of NPU cores 1010, a plurality of memory controllers 1030, and a plurality of memories 1050. The NPU cores 1010 may be an example of the processing cores described herein, and may be replaced with CPU cores or micro-processing unit (MPU) cores. In addition, the memory controllers 1030 may be an example of the interconnect devices described herein, and may be replaced with bus components.

In the example of FIG. 10, the memory controllers 1030 may perform at least one of an accumulation operation on sets of data stored in the memories 1050 or an aggregation operation on results processed by at least one processing core among the NPU cores 1010, based on a command received from the at least one processing core. The memory controllers 1030 may provide a result of the at least one operation to the memories 1050 or the at least one processing core.

In an example, the AI accelerator system 1000 may be connected to a DMA device through such a flat structure and provide an additional computing function to SoC components of an upper layer of the NPU cores 1010 performing a MAC operation. Thus, the AI accelerator system 1000 may perform an aggregation operation, a non-linear filter (NLF) function, and/or a gradient aggregation update in distributed and/or parallel inference and learning processes. The SoC components of the upper layer may include, for example, any one or any combination of any two or more of a CPU, a memory controller, a network switch, a router, and an NPU core of a different level.

Figure 11:
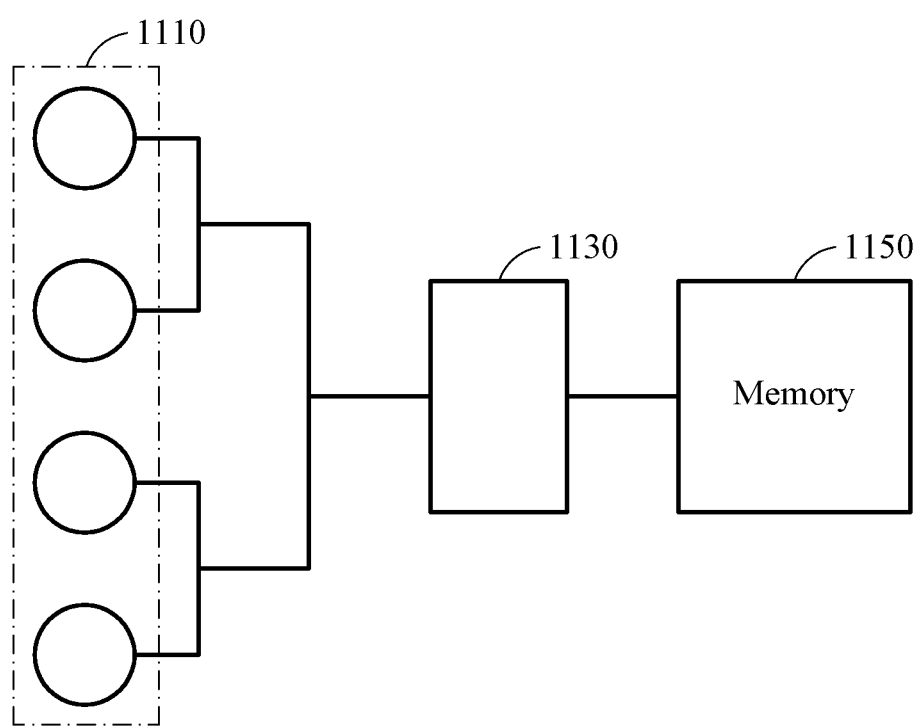
FIG. 11 is a diagram illustrating an example of an AI accelerator system of a hierarchical structure.

FIG. 11 is a diagram illustrating an example of an AI accelerator system 1100 of a hierarchical structure. Referring to FIG. 11, the AI accelerator system 1100 includes, for example, a plurality of NPU cores 1110, a memory controller 1130, and a memory 1150.

In the example, the NPU cores 1110, the memory controller 1130, and the memory 1150 may be configured in a hierarchical structure, not a flat structure, as they configure different layers. In this example, the NPU cores 1110 may also be configured in a hierarchical structure, as they configure a plurality of layers.

Figure 12:
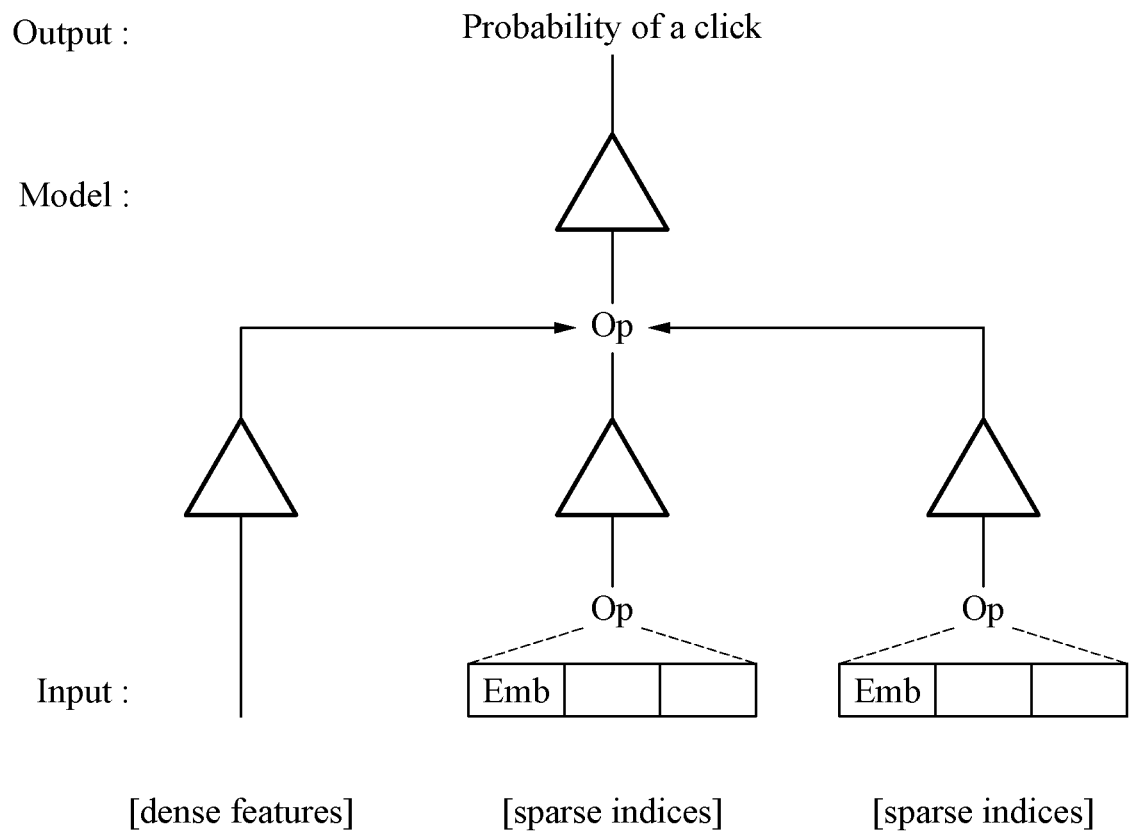
FIG. 12 is a diagram illustrating an example of a deep learning recommendation model.

FIG. 12 is a diagram illustrating an example of a deep learning recommendation model (DLRM) 1200. In the example of FIG. 12, an input to the DLRM 1200 may include, for example, a dense or sparse function. Referring to FIG. 12, a first input to the DLRM 1200 may be dense features which include floating-point values. In addition, a second input and a third input to the DLRM 1200 may be lists of sparse indices of embedded tables, and may include vectors including floating-point values. The input vectors may be transmitted to a multilayer perceptron (MLP) network illustrated in a triangle. According to examples, the vectors may interact with one another through operators (Ops). The MLP network may include fully connected layers, for example.

The DLRM 1200 may perform embedding lookup, for example, $z=Op(e1, \ldots, ek)$, on a sparse index list, for example, $p=[p1, \ldots, pk])$, and obtain a vector, for example, $e1=E[:,p1], \ldots, ek=E[:,pk]$. An operator Op may be $Sum(e1, \ldots, ek)=e1+ \ldots +ek$, or $Dot(e1, \ldots, ek)= [e1'e1+ \ldots +ek'ek+ \ldots +ek'e1+ \ldots +ek'ek]$, in which ' indicates a transpose operation.

Figure 13:
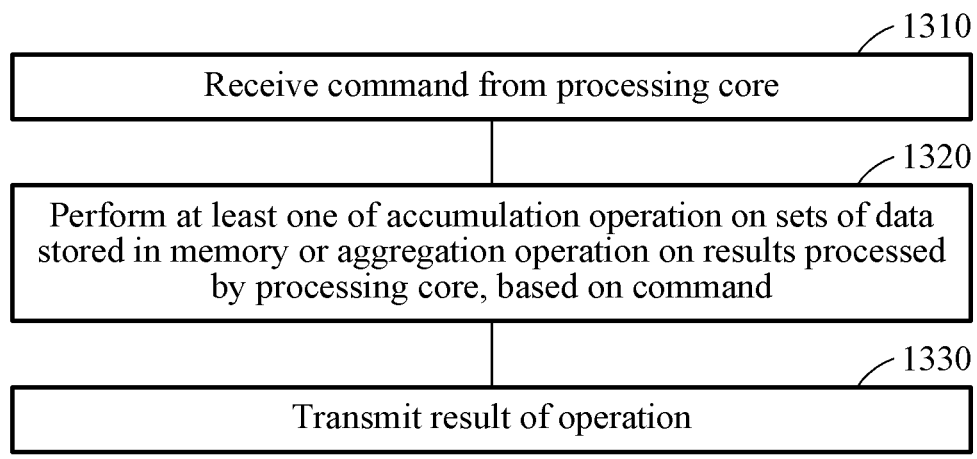
FIG. 13 is a flowchart illustrating an example of an operation method of an interconnect device.

FIG. 13 is a flowchart illustrating an example of an operation method of an interconnect device. Referring to FIG. 13, in operation 1310, an interconnect device receives a command from a processing core. The command may include at least one of an opcode for each of an accumulation operation and an aggregation operation, or address information of a memory in which sets of data for performing an operation associated with the opcode are stored.

In operation 1320, the interconnect device performs either one or both of the accumulation operation on sets of data stored in the memory and the aggregation operation on results obtained through distributed processing by the processing core, based on the command received in operation 1310.

In operation 1330, the interconnect device transmits a result of the operation performed in operation 1320. For example, the interconnect device may transmit the result of the operation to the memory and the processing core, or transmit the result to another processing core or other processing cores.

The AI accelerator systems 100, 900, 1000, and 1100, the processing cores 110, 140, 170, 910, 920, 930, 940, the interconnect devices 120, 120-1, 120-2, 120-3, 150, 180, 600, and 700, the memories 130, 160, 190, 1050, and 1150, the reads data modules 210, 320, 430, 530, and 705, the command modules 220, 330, 450, 570, 620, and 750, the address modules 230, 340, 460, 580, 630, and 760, the MUXs 240, 350, 420, 440, 520, 540, and 720, the adders 250, 360, 443, 545, 640, 715, and 735, the data ports 260, 370, 445, 560, 660, 725, and 745, the control ports 270, 380, 470, 590, 670, and 755, the address ports 280, 390, 480, 595, 680, and 765, the control modules 310, 410, and 510, the controllers 311, 411, and 511, the counter registers 313, 413, and 513, the address storage registers 315, 415, and 515, the sub-data modules 431, 433, 435, 437, 531, and 533, the DEMUXs 435, 550, 650, and 740, the NPU cores 1010 and 1110, the memory controllers 1030 and 1130, the memories 1050 and 1150, the processors, the memories, the cores, the NPU cores, the controllers, and other components, modules and devices in FIGS. 1-13 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-13 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An interconnect device, comprising:
a plurality of hardware-implemented circuitries configured to:
receive a command from a processing core;
perform, based on the received command, an operation including an accumulation operation on sets of data stored in a memory and an aggregation operation on results processed by the processing core; and
provide a result of the performing of the accumulation operation and the aggregation operation,
wherein the plurality of hardware-implemented circuitries comprise:
control circuitry configured to generate a control signal based on the received command, and determine an address of the memory based on address information of the memory received from the processing core;
address circuitry configured to generate a signal corresponding to the address of the memory based on the received command;
command circuitry configured to transmit, to the memory, the control signal, in response to the control signal being received from the control circuitry; and
read data circuitry configured to transmit, to the processing core, data read from the memory and cumulative data in which sets of the data read from the memory are accumulated, based on the control signal,
wherein the read data circuitry comprises a plurality of sub-data circuitries, and is configured to provide the processing core with the cumulative data stored in one sub-data circuitry among the sub-data circuitries, based on the control signal, and
wherein the cumulative data is data in which the data read from the memory and data of the one sub-data circuitry are accumulated.

2. The interconnect device of claim 1, wherein the received command includes at least one of:
an operation code (opcode) for each of the accumulation operation and the aggregation operation; and
the address information of the memory in which the sets of data are stored.

3. The interconnect device of claim 1, wherein the command circuitry is configured to store and transmit the received command; and
wherein the address circuitry is configured to store and transmit the address information of the memory in which sets of data for performing the accumulation operation and the aggregation operation based on the received command are stored.

4. The interconnect device of claim 3, wherein the read data circuitry comprises:
an adder configured to, based on the received command, add the data read from the memory and data stored in the read data circuitry to generate added data; and
a multiplexer (MUX) configured to provide the read data circuitry with either one of the data read from the memory and the added data of the adder, based on the received command.

5. The interconnect device of claim 4, wherein the read data circuitry further comprises: a multiplier configured to multiply the data read from the memory and the data stored in the read data circuitry together, based on the received command.

6. The interconnect device of claim 3, wherein the control circuitry is configured to provide the address circuitry with the address of the memory, in response to the address information being received from the processing core, and
wherein the command circuitry is configured to transmit the control signal to the read data circuitry and the memory.

7. The interconnect device of claim 6, wherein the control circuitry comprises:
an address storage register configured to store therein a source address of the memory corresponding to the address information;
a counter register configured to perform counting based on the source address, based on the received command; and
a control circuit configured to provide the address circuitry with the address of the memory, the address of the memory being determined based on a result of the counting.

8. The interconnect device of claim 1, wherein the read data circuitry further comprises:
an adder configured to, based on the control signal, add the data read from the memory and the data of the one sub-data circuitry to generate added data;
a first multiplexer (MUX) configured to output either one of the data read from the memory and the added data of the adder, based on the control signal;
a demultiplexer (DEMUX) configured to output, to the one sub-data circuitry, data output from the first MUX, based on the control signal; and
a second MUX configured to output the data of the one sub-data circuitry, based on the control signal.

9. The interconnect device of claim 1, wherein the control circuitry comprises:
a register configured to store therein a source address of the memory based on the address information;
a counter register configured to perform counting based on the source address, based on the received command; and
a control circuit configured to provide the address circuitry with the address of the memory, the address of the memory being determined based on a result of the counting, and provide the command circuitry with the control signal.

10. The interconnect device of claim 1, wherein the read data circuitry comprises:
   a second sub-data circuitry configured to store the data read from the memory, and
   wherein the read data circuitry is configured to output either one of the cumulative data and the data read from the memory based on the control signal.

11. The interconnect device of claim 1, wherein the command circuitry is configured to store and transmit the received command;
   wherein the address circuitry is configured to store and transmit address information of the memory in which sets of data for performing the accumulation operation and the aggregation operation based on the received command are stored; and
   wherein the plurality of hardware-implemented circuitries further comprises write data circuitry configured to transmit, based on the received command, to the memory, given result data processed by the processing core or cumulative data in which sets of result data processed by and received from the processing core are accumulated.

12. The interconnect device of claim 11, wherein the write data circuitry comprises:
   an adder configured to add the given result data processed by the processing core and data to be stored in the memory to generate added data; and
   a multiplexer (MUX) configured to provide the memory with either one of the given result data processed by the processing core and the added data of the adder.

13. The interconnect device of claim 12, wherein the write data circuitry further comprises: a divider configured to divide the added data of the adder; or
   a shift register configured to shift the added data of the adder by one bit.

14. The interconnect device of claim 1, wherein the plurality of hardware-implemented circuitries further comprises write data circuitry configured to transmit, to the memory, given data received from the processing core or cumulative data in which sets of data received from the processing core are accumulated, based on the received command.

15. The interconnect device of claim 14, wherein the write data circuitry comprises:
   an adder configured to add the given data received from the processing core and data to be stored in the memory to generate added data; and
   a multiplexer (MUX) configured to provide the memory with either one of the given data received from the processing core and the added data of the adder, based on the command.

16. The interconnect device of claim 1, wherein the interconnect device is configured to access the memory through direct memory access (DMA).

17. The interconnect device of claim 1, wherein the processing core comprises any one of a central processing unit (CPU), a graphics processing unit (GPU), and a neural processing unit (NPU).

18. The interconnect device of claim 1, wherein the memory comprises any one of a static random-access memory (SRAM), a dynamic RAM (DRAM), and a flash memory.

19. An artificial intelligence (AI) accelerator system comprising:
   processing cores;
   interconnect circuitries; and
   a memory,
   wherein the interconnect circuitries are connected to the processing cores and the memory, and
   wherein one of the interconnect circuitries is configured to:
      receive a command from at least one processing core among the processing cores;
      perform, based on the received command, an operation including an accumulation operation on sets of data stored in the memory and an aggregation operation on results processed by the at least one processing core; and
      provide the memory or the at least one processing core with a result of the performing of the accumulation operation and the aggregation operation,
   wherein the one of the interconnect circuitries comprises:
      control circuitry configured to generate a control signal based on the received command, and determine an address of the memory based on address information received from the processing core;
      address circuitry configured to generate a signal corresponding to the address of the memory based on the received command;
      command circuitry configured to transmit, to the memory, the control signal, in response to the control signal being received from the control circuitry; and
      read data circuitry configured to transmit, to the processing core, data read from the memory and cumulative data in which sets of the data read from the memory are accumulated, based on the control signal,
   wherein the read data circuitry comprises a plurality of sub-data circuitries, and is configured to provide the processing core with the cumulative data stored in one sub-data circuitry among the sub-data circuitries, based on the control signal, and
   wherein the cumulative data is data in which the data read from the memory and data of the one sub-data circuitry are accumulated.

20. An operation method of an interconnect device, comprising:
   receiving a command from a processing core;
   performing, based on the received command, an operation including an accumulation operation on sets of data stored in a memory and an aggregation operation on results obtained through distributed processing by the processing core; and
   transmitting a result of the performing of the accumulation operation and the aggregation operation,
   wherein the interconnect device comprises:
      control circuitry configured to generate a control signal based on the received command, and determine an address of the memory based on address information of the memory received from the processing core;
      address circuitry configured to generate a signal corresponding to the address of the memory based on the received command;
      command circuitry configured to transmit, to the memory, the control signal, in response to the control signal being received from the control circuitry; and
      read data circuitry configured to transmit, to the processing core, data read from the memory and cumulative data in which sets of the data read from the memory are accumulated, based on the control signal, wherein the read data circuitry comprises a plurality of sub-data circuitries, and is configured to provide the processing core with the cumulative data stored in one sub-data circuitry among the sub-data circuitries, based on the control signal, and wherein the cumulative data is data in which the data read from the memory and data of the one sub-data circuitry are accumulated.

21. The operation method of claim 20, wherein the received command includes at least one of:
  an operation code (opcode) for each of the accumulation operation and the aggregation operation; and
  the address information of the memory in which sets of data are stored.

22. A non-transitory computer-readable storage medium storing instructions that, when executed by a processor, cause the processor to perform the operation method of claim 20.

23. A processing accelerator system comprising:
  a neural processing unit;
  a memory; and
  a memory controller connected to the neural processing unit and the memory, and configured to:
    receive a command from the neural processing unit;
    perform, based on the received command, an operation including an accumulation operation on sets of data stored in the memory and an aggregation operation on results processed by at least one processing core; and
    transmit, to the memory or the neural processing unit, a result of the performing of the accumulation operation and the aggregation operation,
  wherein the memory controller comprises:
    control circuitry configured to generate a control signal based on the received command, and determine an address of the memory based on address information of the memory received from the at least one processing core;
    address circuitry configured to generate a signal corresponding to the address of the memory based on the received command;
    command circuitry configured to transmit, to the memory, the control signal, in response to the control signal being received from the control circuitry; and
    read data circuitry configured to transmit, to the at least one processing core, data read from the memory and cumulative data in which sets of the data read from the memory are accumulated, based on the control signal,
  wherein the read data circuitry comprises a plurality of sub-data circuitries, and is configured to provide the at least one processing core with the cumulative data stored in one sub-data circuitry among the sub-data circuitries, based on the control signal, and
  wherein the cumulative data is data in which the data read from the memory and data of the one sub-data circuitry are accumulated.

24. The processing accelerator system of claim 23, wherein the memory controller further comprises:
  an adder configured to, based on the received command, add the data read from the memory and data stored in the read data circuitry to generate added data; and
  a multiplexer (MUX) configured to provide the read data circuitry with either one of the data read from the memory and the added data of the adder, based on the received command.

25. The processing accelerator system of claim 23, wherein the command circuitry is configured to store and transmit the received command,
  wherein the address circuitry is configured to store and transmit address information of the memory in which sets of data for performing the accumulation operation and the aggregation operation based on the received command are stored, and
  wherein the memory controller further comprises write data circuitry configured to transmit, to the memory, given result data processed by the at least one processing core or cumulative data in which sets of result data processed by and received from the at least one processing core are accumulated, based on the received command.

26. The processing accelerator system of claim 25, wherein the memory controller further comprises:
  an adder configured to add the given result data processed by the at least one processing core and data to be stored in the memory to generate added data; and
  a multiplexer (MUX) configured to provide the memory with either one of the given result data processed by the at least one processing core and the added data of the adder.

* * * * *